United States Patent [19]

Miles et al.

[11] 3,750,445

[45] Aug. 7, 1973

[54] TUBE-COILING APPARATUS

[76] Inventors: Derek Miles, Colespond Farm, West Tytherley, near Salisbury, Wiltshire; Ian M. Musson, 61 Riverside Gardens, Romsey, Hampshire, both of England

[22] Filed: June 1, 1971

[21] Appl. No.: 148,683

[30] Foreign Application Priority Data
Oct. 13, 1969 Great Britain.................. 50,252/69
Dec. 12, 1969 Great Britain.................. 60,759/69

[52] U.S. Cl. .............................................. 72/144
[51] Int. Cl............................................. B21f 3/04
[58] Field of Search...................... 72/142, 144, 145; 242/82

[56] References Cited
UNITED STATES PATENTS

| | | | |
|---|---|---|---|
| 25,294 | 8/1859 | Weimer ................................ | 72/144 |
| 1,827,056 | 10/1931 | Williams.............................. | 72/144 |
| 280,983 | 7/1883 | Whitlock ............................. | 72/144 |
| 3,415,092 | 12/1968 | Dean.................................... | 72/144 |
| 2,264,800 | 12/1941 | Horstman ............................ | 72/142 |

Primary Examiner—Charles W.. Lanham
Assistant Examiner—R. M. Rogers
Attorney—Fleit, Gipple and Jacobson

[57] ABSTRACT

Tube coiling apparatus comprises a rotatable cylindrical member having a helical groove in its cylindrical surface, the groove being semi-circular in cross-section and equal in diameter to the diameter of the tube to be coiled. A roller has a groove therein of a cross-section corresponding to the cross-section of the groove in the cylindrical member and is mounted adjacent the groove in the cylindrical member for rotation about an axis offset from the axis of the cylindrical member by the helix angle of the groove in the cylindrical member. One end of a length of tube to be coiled is inserted between the roller and the cylindrical member and is secured to the cylindrical member. The cylindrical member is then rotated and the grooved roller moved axially of the cylindrical member to wind the tube into the groove in the cylindrical member and thus into a helical coil. The grooved roller may be moved axially of the cylindrical member by a lead screw or by mounting it in a yoke which also mounts rollers having convex peripheral surfaces engaged in the groove in the cylindrical member.

10 Claims, 10 Drawing Figures

PATENTED AUG 7 1973 3,750,445

Inventors
Derek Miles
Ian M. Musson
Fleit, Gipple & Jacobson
Attorneys

PATENTED AUG 7 1973 3,750,445

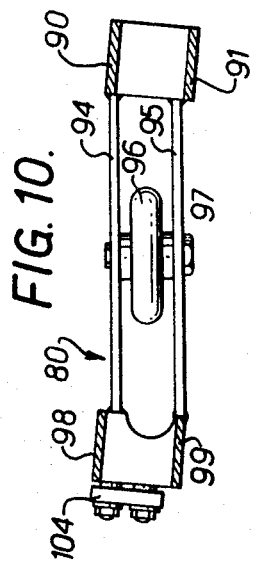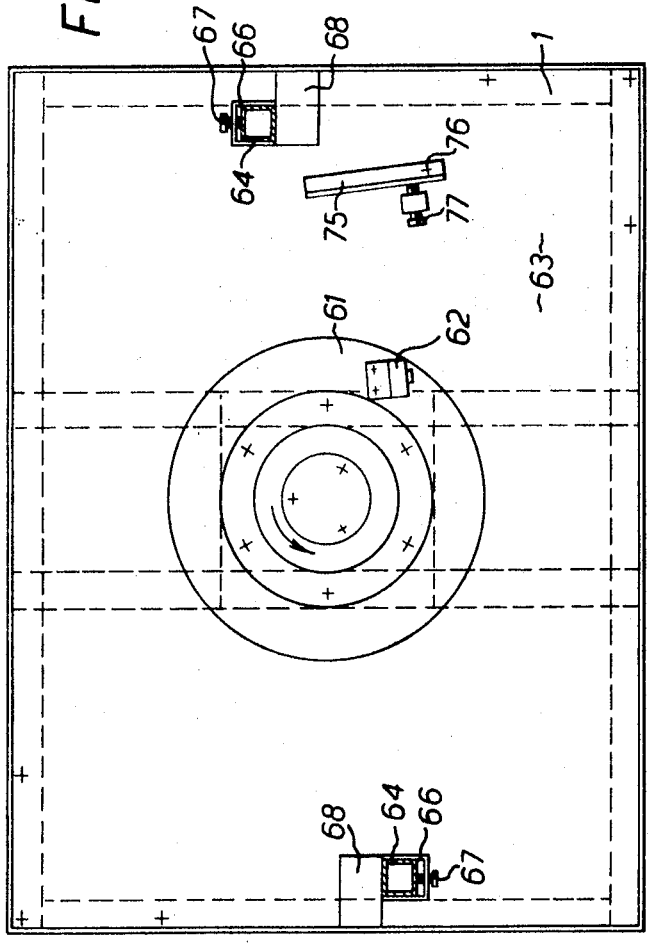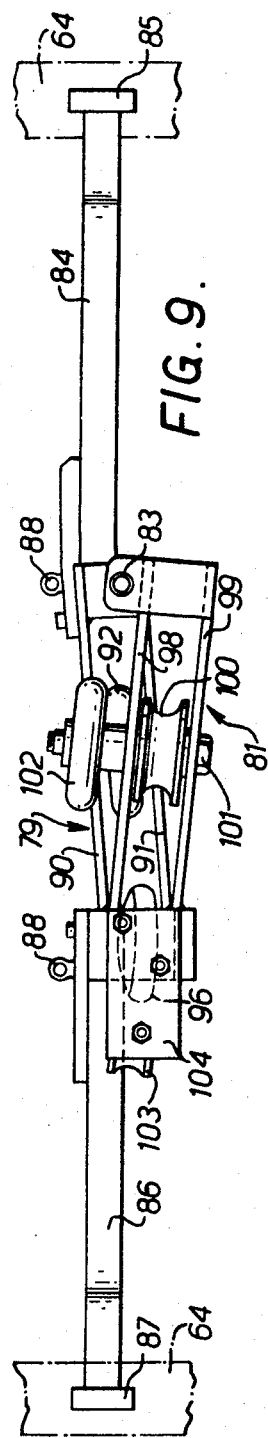

TUBE-COILING APPARATUS

The invention relates to tube coiling apparatus.

Coiling of metal tubes, particularly thin walled metal tubes poses considerable problems as such tubes have a tendency to flatten as they are bent.

Known methods of coiling metal tubes into helical coils comprise packing the tube to be coiled with sand or other particulate material and then wrapping the tube around a mandrel or inserting a flexible core spring into a length of tube to be coiled and extracting it therefrom, as the tube is wrapped around a mandrel, at a rate such that an inner end of the core spring is always located at the portion of the tube actually being bent. Neither of these methods is satisfactory in that they are time consuming and unless effected by highly skilled personnel produce a product of widely varying quality with the likelihood of flattening of the tube and incorporation of crease marks therein which are both unsightly and likely to reduce the physical strength of the tube.

The invention has among its objects to provide a method and apparatus for coiling a tube which quickly and simply produces a helically coiled tube, even from thin walled tube of consistently high quality without requiring the use of highly skilled personnel.

According to the invention there is provided a method of forming a tube into a helical coil comprising securing a portion of a tube adjacent one of the ends thereof to a cylindrical member having a helical groove therein, engaging a grooved roller with said tube in a manner such that the groove in the roller and the groove in the cylindrical member together define a circular aperture with a diameter substantially equal to that of the tube, rotating said cylindrical member and moving said roller axially of said cylindrical member in a manner to cause the tube to be wound into a helical coil with a pitch and diameter substantially corresponding to the pitch and diameter of the helical groove in the cylindrical member.

According to the invention furthermore, apparatus for forming a tube into a helical coil comprises a cylindrical member having a helical groove therein, means for securing a portion of a tube adjacent one of the ends thereof, to said cylindrical member, a grooved roller so mounted that the groove in the roller and the groove in the cylindrical member together define a circular aperture with a diameter substantially equal to the diameter of the tube to be formed into a helical coil, means for rotating the cylindrical member and means for moving the grooved roller axially of the cylindrical member in a manner to cause the tube to be wound into a helical coil with a pitch and diameter substantially corresponding to the pitch and diameter of the helical groove in the cylindrical member.

The means for moving the grooved roller axially of the cylindrical member may comprise a lead screw and slide or alternatively may comprise rollers mounted on a yoke and engaging in the helical groove in the cylindrical member at positions displaced circumferentially around the cylindrical member.

The invention is diagrammatically illustrated by way of example in the accompanying drawings, in which:

FIG. 7 is a view on line VII—VII of FIG. 6;

FIG. 9 is a view taken in the direction of arrow IX of FIG. 8;

FIG. 10 is a sectional view on line X—X of FIG. 8.

Figure 1:
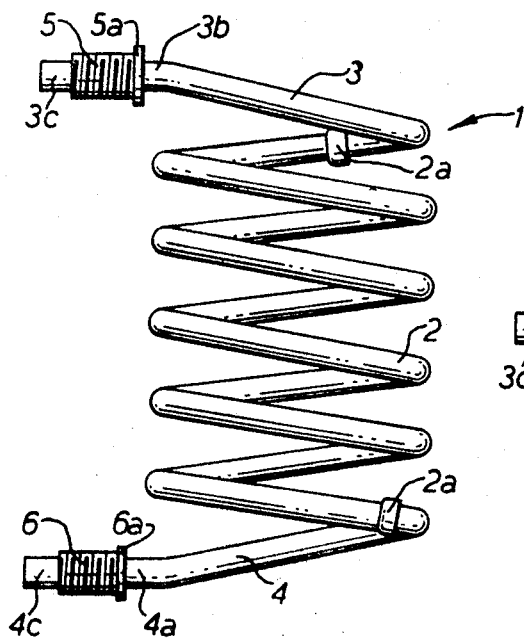
FIG. 1 is a side elevation of a heating unit formed from a helically coiled tube formed by the method according to the invention.
Figure 2:
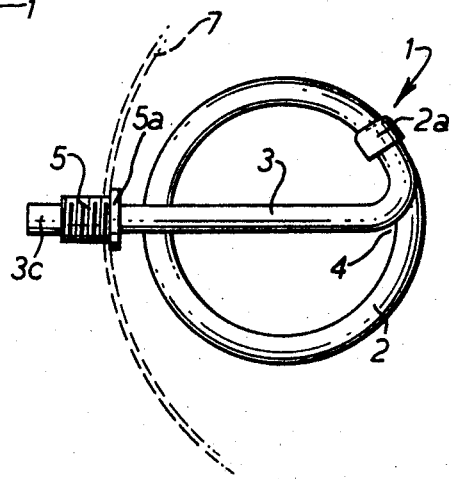
FIG. 2 is a plan view corresponding to FIG. 1.

Referring to FIGS. 1 and 2 of the drawings, a heating unit 1 for a domestic hot water tank comprises a helically coiled tube 2, advantageously of copper, stainless steel or galvanised steel, a top end fitting 3 and a bottom end fitting 4. The coil 2 advantageously comprises approximately a 10 foot length of ¾ inch tube coiled to approximately four and three-quarter turns. The end fittings 3 and 4 are secured to the coil 2 by expanding end portions 2a of the coil 2, inserting therein the end of the tube of the respective end fittings 3 and 4, which tube is of the same material and dimensions as the tube of the coil 2, and brazing or soldering the joint.

The end fittings 3 and 4 are bent at 3a and 4a respectively so that end portions 3b and 4b of the end fittings 3 and 4 respectively are parallel one to the other and perpendicular to the axis of the coiled tube 2. Bushes 5 and 6, each outwardly screw threaded and including a flange 5a and 6a respectively, whereby they are shouldered, are engaged over the portions 3b and 4b respectively of the end fittings 3 and 4 and brazed or soldered thereto with a portion 3c, 4c of the end fittings 3 and 4 respectively extending therethrough. The outside diameter of the coiled tube 2 is advantageously in the region of 8½ inches and the distance between the centres of the portions 3c and 4c of the end fittings 3 and 4 approximately 14 inches.

When mounted in a tank 7 the bushes 5 and 6 project through apertures in the wall of the tank 7, the flanges 5a and 6a of the bushes 5 and 6 respectively bearing against the inner wall of the tank.

Figure 5:
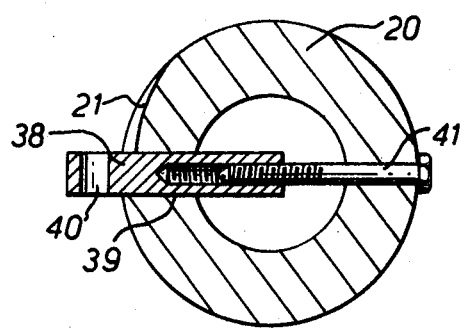
FIG. 5 is a sectional view on line V—V of FIG. 3.
Figure 3:
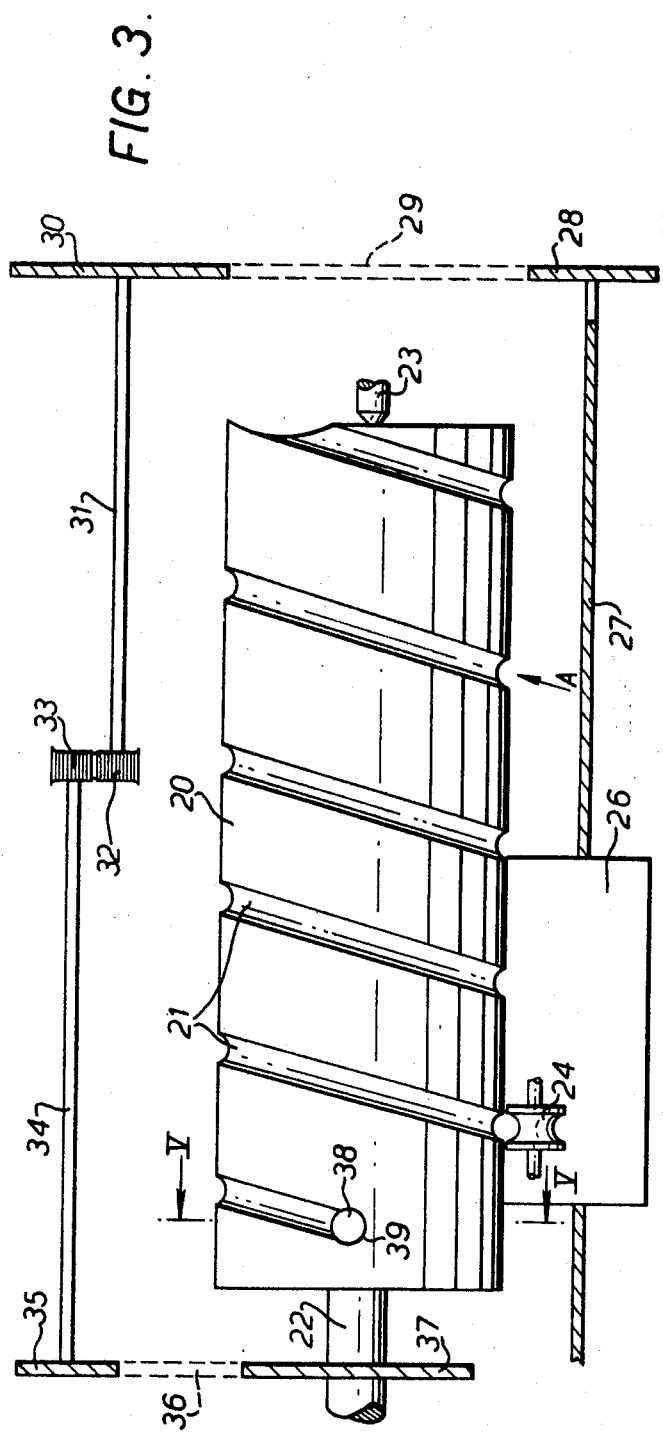
FIG. 3 is a plan view of apparatus according to the invention, for coiling a tube.
Figure 4:
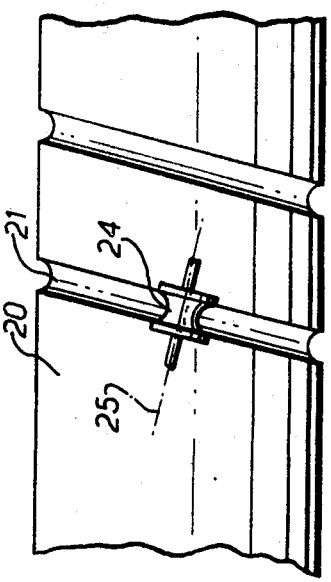
FIG. 4 is a fragmentary elevation corresponding to part of FIG. 3.

Referring to FIGS. 3, 4 and 5, a machine for forming the coiled tube 2 comprises a cylindrical member 20, advantageously of cast iron, having a helical groove 21 therein, the groove 21 being semi-circular when viewed along the groove in the direction of the arrow A of FIG. 3 and being of the same diameter as the diameter of the tube to be coiled. The cylindrical member 20 is rotatably mounted by means of a shaft 22 at one end and a tail-stock 23 at the other end, advantageously on a lathe.

A freely rotatable roller 24 is trunnion mounted on an axis 25 which is perpendicular to the direction in which the groove 21 extends, as can be seen from FIG. 4, and is supported on a slide 26 for movement longitudinally of the cylindrical member 20. The groove in the roller 24 is of semi-circular cross-section, corresponds in diameter to the diameter of the tube to be coiled, and, together with the groove in the cylindrical member 20, defines a circular aperture of the same diameter as the tube to be coiled. Movement of the slide 26 longitudinally of the roller 20 is effected by a lead screw 27 mounting a sprocket 28. The sprocket 28 is driven by a chain 29 from a sprocket 30 on a lay-shaft 31, the lay-shaft 31 mounting a gear 32 meshing with a gear 33 on a further lay-shaft 34, the further lay-shaft 34 also mounting a sprocket 35 which is driven by a chain 36 from a sprocket 37 driven by a shaft 22.

A plug 38, shown in detail in FIG. 5, is slidably mounted in a bore 39 in the cylindrical member 20 for movement radially of the cylindrical member 20. The plug 38 includes a transverse aperture 40 of a size slidingly to receive one end of the tube to be coiled. After insertion of said one end of the tube in the aperture 40, a bolt 41 can be tightened to retract the plug 38 and clamp said end of the tube in the bore 30 by causing said end of the tube to engage the outer face of the cylindrical member 20.

To form a length of tube to a helical coil 2, one end of the tube is inserted in the transverse aperture 40 of the plug 38 and the bolt 41 is tightened. The roller 24 is then engaged over the tube adjacent the plug 38 to press against the outer wall of the tube. The cylindrical member 20 is then rotated by the shaft 22, anticlockwise as viewed from the end supported by the tail-stock 23, rotation of the shaft 22 causing rotation of the lead screw 27 to move the slide 26 longitudinally of the cylindrical member 20 at a rate such that the roller 24 is always engaged with the cylindrical member 20 with the groove in the roller 24 lying over the groove 21 in the cylindrical member 20. Rotation of the cylindrical member 20 causes the tube to be drawn between the roller 24 and the groove 21 to wrap the tube around the cylindrical member 20 within the groove 21 to form the tube to a coil. As soon as the other end of the tube passes under the roller 24, the rotation of the cylindrical member 20 is stopped and the bolt 41 of the plug 38 is released. The coiled tube will spring out slightly from the groove 21. The bending roller 24 is moved away from the cylindrical member 20. If the cylindrical member 20 is then again rotated with the coiled tube held against rotation by hand, the coiled tube will unscrew itself from the groove 21 and can be removed from the cylindrical member 20 by removing the tail-stock. The cylindrical member 20 is then rotated in a reverse direction until the slide 26 has returned the roller 24 to its start position adjacent the plug 38 and the apparatus is ready to effect a further coiling operation on a further length of tube.

Referring to FIGS. 6 to 10, a machine for coiling a tube comprises a housing 50 mounted on legs 51 and enclosing a drive motor 52, a gear box 53 and a belt drive 54 from an output shaft 55 of the gear box 53. The belt drive 54 drives a shaft 56 mounted in a lower bearing 57 and an upper bearing 58. A solid cylindrical member 59, advantageously of cast iron, is secured to the upper end of the shaft 56 and is rotated thereby, the cylindrical member 59 having a helical groove 60 therein of semi-circular cross-section. A flange 61 is provided at the lower end of the cylindrical member 59 and rotates therewith, the flange 61 bearing an apertured block 62 for a purpose to be described hereinafter. The flange 61 is raised slightly above an upper flat face 63 of the housing 1.

Upstanding square-section members 64 are provided on the housing 1 at diametrically opposite positions having regard to the cylindrical member 59. The upstanding members 64 are joined at the upper ends by a cross beam 65. A collar 66 is slidable on each of the upstanding members 64 and adjustable in position thereon by means of screws 67. Each collar 66 has a plate 68 at its upper end, the plate 68 being, as viewed in FIG. 6, on the front side of the righthand upstanding member 64 and on the rear of the lefthand upstanding member 64. The righthand upstanding member 64, as viewed in FIG. 6, has an adjustably mounted switch 69 thereon, the switch 69 including a trip lever 70 for a purpose to be described hereinafter.

Below the upper bearing 58 on the shaft 56 a disc 71 is mounted, the disc 71 bearing a trip member 72 to cooperate with a trip lever 73 of a switch 74, for a purpose to be described hereinafter.

On the upper face 63 of the housing 61, a stop member 75 is pivoted at 76, for movement about a vertical axis, and cooperates with a stop screw 77.

Figure 8:
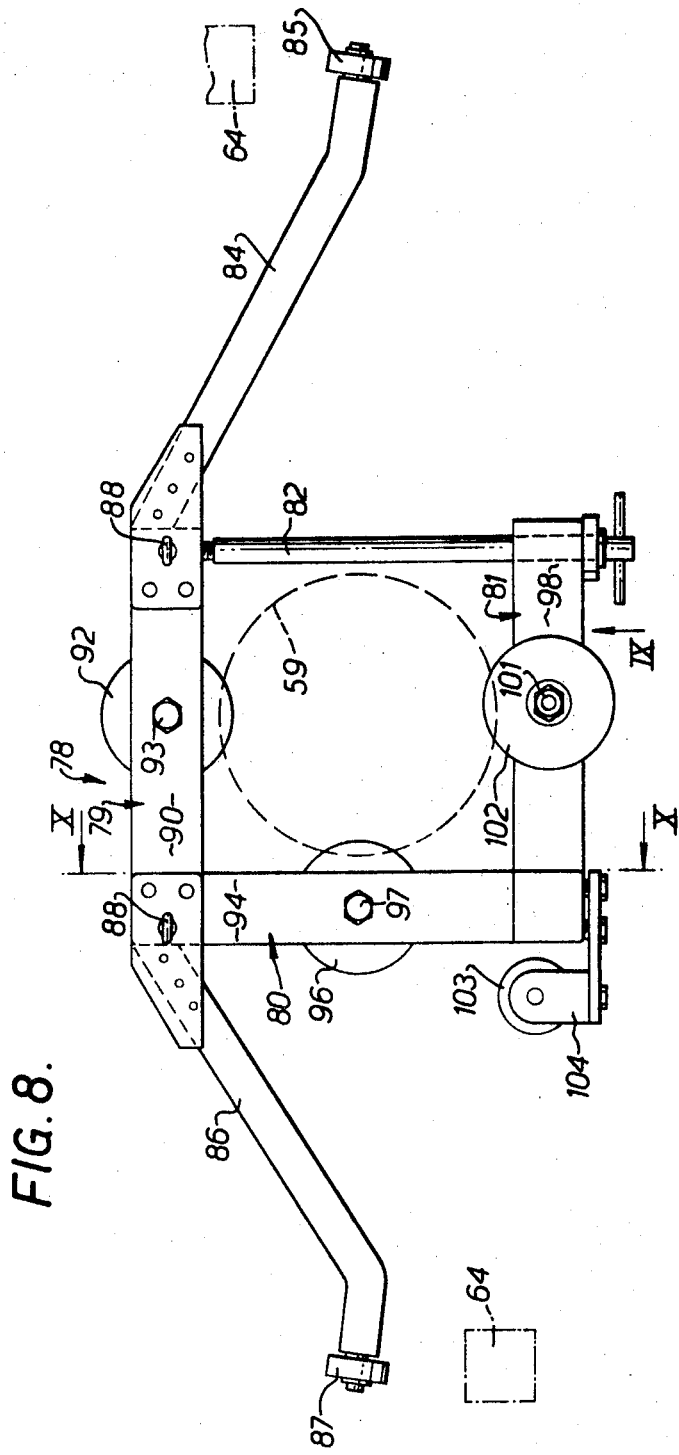
FIG. 8 is a plan view of a yoke for use with the apparatus of FIGS. 6 and 7.

Referring to FIGS. 8, 9 and 10, a yoke 78 has three members 79, 80 and 81 rigidly secured together to form three sides of a square, the fourth side of the square being formed by a removable retaining strap 82 which passes through a bore 83 in one end of the member 81 and engages in a screw threaded aperture in one end of the member 79.

An arm 84 extends from said one end of the member 79 and bears a roller 85 at its outer end and a similar arm 86 extends from said other end of the member 79 and bears a roller 87 at its outer end, the dimensions of the yoke 78 being such that with the square frame formed by the members 79, 80, 81 and 82 surrounding the cylindrical member 59, the rollers 85 and 87 bear respectively against the front face of the righthand upstanding member 64 and the rear face of the lefthand upstanding member 64.

At each of its ends the member 79 of the yoke 78 has an eyebolt 88 in its upper face whereby the yoke 78 can be supported from the cross beam 65 by a cord 89 which passes over grooved pulleys in the cross beam 65 and is connected to a counterweight (not shown) which counterbalances the weight of the yoke 78.

The members 79, 80 and 81 are each formed by upper and lower webs spaced apart in a vertical direction and welded to end blocks at their junctions with adjacent members. Thus, the member 79 comprises an upper web 90 and a lower web 91 with a roller 92 having a convex peripheral surface mounted on an axle bolt 93 which extends through the webs 90 and 91. The member 80, as shown in FIG. 10, has an upper web 94 and a lower web 95 with a roller 96 with a convex peripheral surface mounted on a axle bolt 97 which extends through the webs 94 and 95.

The member 81 has an upper web 98 and a lower web 99 with a roller 100 having a concave outer peripheral surface mounted on an axle bolt 101 which extends through the webs 98 and 99 and a roller 102 having a convex peripheral outer surface mounted coaxial with the roller 100 on the axle bolt 101.

A roller 103 having a concave outer peripheral surface is mounted on a bracket 104 secured at the lefthand end of the member 81 as viewed in FIG. 8.

The members 79, 80 and 81 are not coplanar, as can be seen from FIG. 9, but are so arranged that, with the square frame formed by the members 79, 80, 81 and 82, surrounding the cylindrical member 59 and with the concave roller 100 aligned with a portion of the helical groove 60 in the cylindrical member 59, the convex roller 102 lies in and is aligned with the helical groove 60 at a position one turn of the helical groove 60 above the portion with which the concave roller 100 is aligned, the convex roller 96 lies in and is aligned with the helical groove 60 at a position angularly spaced 90° around the cylindrical member 59 from the portion with which the concave roller 100 is aligned and the convex roller 92 lies in and is aligned with the groove 60 at a position angularly spaced around the cylindrical member 59, 180° from the portion with which the concave roller 100 is aligned.

The helical groove 60 in the cylindrical member 59 advantageously has a 5° helix angle and, with the arms 84 and 96 of the yoke 78 extending in a horizontal plane, each of the axle bolts 93, 97 and 101 is offset at an angle of 5° to the vertical.

Figure 6:
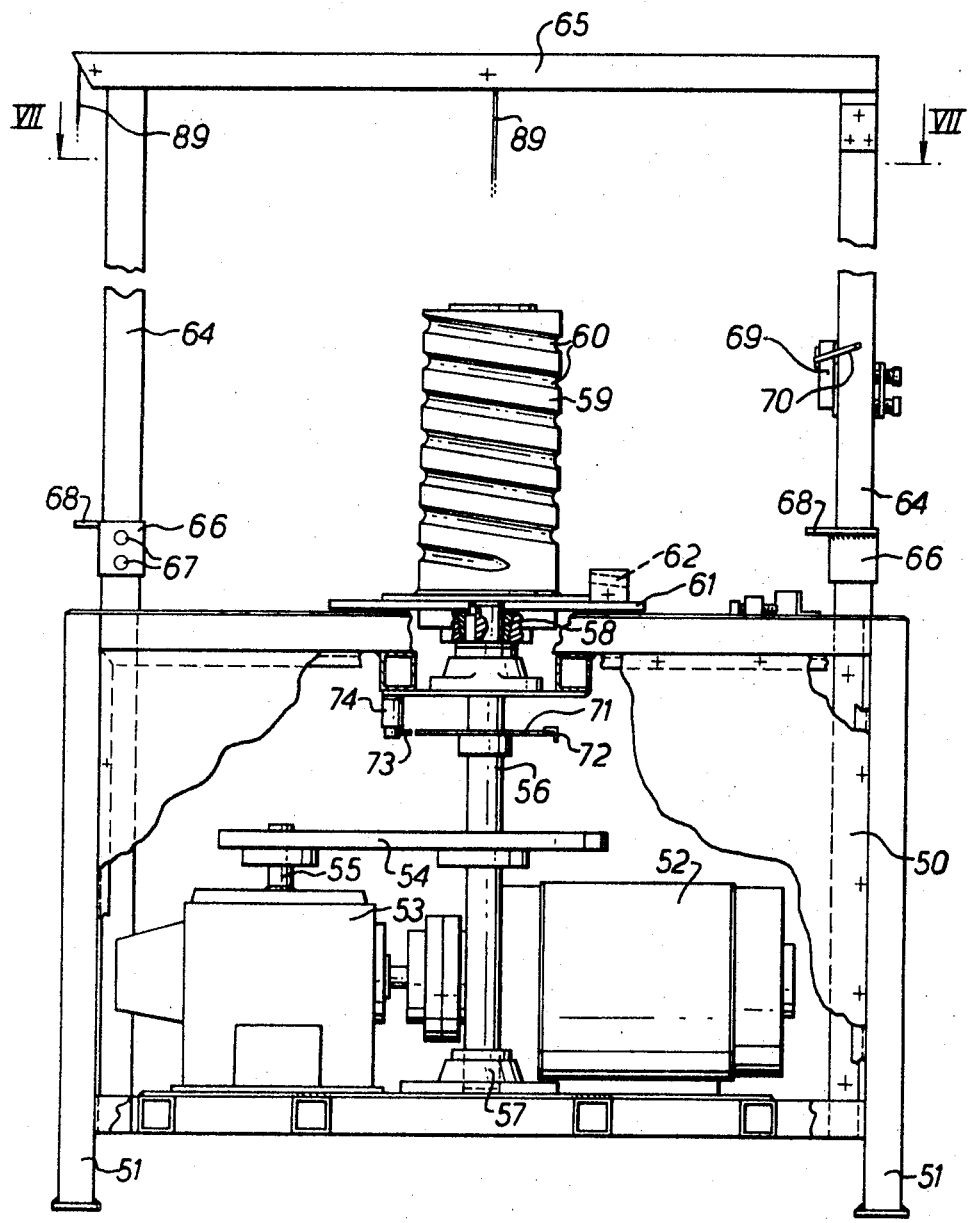
FIG. 6 is an elevation partly cut away of an alternative embodiment of apparatus according to the invention for coiling a tube.

In operation to coil a length of copper tube, for example of 0.846 inches in diameter into a coil, the yoke 78, after removing the strap 82 by unscrewing it from the screw threaded bore in the end of the member 79, is positioned, as viewed in FIG. 6, between the lefthand upstanding member 64 and the cylindrical member 59 and is supported by the counterweights and the cord 89.

One end of a straight length of copper tube is then laid in the groove in the concave roller 103, the groove in the concave roller 100 and the lower end of the helical groove 60 in the cylindrical member 59, is passed through a bore (indicated by dotted lines in FIG. 6) in the block 62 on the flange 61 of the cylindrical member 59 and is butted against the stop member 75 which is pulled up against its stop screw 77. The yoke 78 can then be slid rightwardly, as viewed in FIG. 6, to engage the convex rollers 92, 96 and 102 in the helical groove 60 of the cylindrical member 59 and to position the concave roller 100 against the cylindrical member 59 in a manner such that the bottom end of the helical groove 60 and the portion of the concave roller 100 nearest the cylindrical member 59 form a circular bore with the length of copper tube passing therethrough. The rollers 85 and 87 at the ends of the arms 84 and 86 respectively lie on the platforms 68 of the collars 66 and assist location of the yoke 78 in the desired position. The strap 82 is then inserted through the bore 83 in the member 81 and engaged in the screw threaded bore in the member 79.

The motor 52 is then energised to rotate the shaft 56 by means of the gear box 53 and belt drive 54 to rotate the cylindrical member 59 in an anticlockwise direction as viewed from above and as shown by the arrow in FIG. 7. Abutment of the rollers 85 and 87 with the upstanding members 64 prevents the yoke 79 being carried round by the cylindrical member 59 and engagement of the convex rollers 92, 96 and 102 in the groove 60 causes the yoke 78 to rise vertically, the concave roller 100 winding the length of copper tube into a helical coil, that is to say winding it into the groove 60 in the cylindrical member 59. As it nears the top of the cylindrical member 59, the arm 84 will trip the trip lever 70 of the switch 69. Before this happens the shaft 56 and thus the disc 71 will have made several rotations and the trip member 72 on the disc 71 will have tripped the trip lever 73 of the switch 74 several times. Such tripping of the switch 74 will, however, have no effect before the arm 84 operates the switch 69. However, tripping of the switch 74 by the trip member 72, after the arm 84 has operated the switch 69, will cause the cylindrical member 59 to stop at a particular accurately determined angular position. The retaining strap 82 is then unscrewed and removed allowing the yoke 78, supported by the cord 89 and counterweight, to be moved away from the cylindrical member leftwardly, as viewed in FIG. 6. The copper tube coiled into a coil and having tangentially extending end portions, the lower one of which extends through the bore in the member 62, is left on the cylindrical member 59. The lower tangentially extending end portion is then freed from the member 62 by removing a portion of the member 62 after releasing a clamping bolt (not shown), and the motor 52 is again energised to rotate the cylindrical member 59 in the same direction as before, the operator holding one end of the coiled tube to prevent it from rotating so that the coiled tube is raised upwardly by the helical groove 60 in the cylindrical member, the resilience of the metal causing the coil to spring slightly outwardly from the groove 60, to be freed from the cylindrical member. The operator then manually trips the switch 69 by the trip lever 70 and the cylindrical member 59 is stopped in the particular accurately determined angular position shown ready for the yoke 78 to be pulled down against the action of the counterweight to the start position to repeat the operation.

The concave roller 103 is not absolutely necessary but it has been found that it prevents excessive vibrational movement of the free end of the length of tube being wound into a coil, which vibrational movement is likely to cause crease marks on the coiled tube, the spacing apart of the crease marks reducing as the frequency of vibration of the free end increases due to progressive shortening thereof during winding of the tube into a coil.

After the coiled tube with the two tangentially extending end portions has been removed from the cylindrical member 59, the two tangentially extending end portions can be bent around, using a core spring to prevent flattening of the tube at the bend, to form end fittings for the coil corresponding to the end fittings 3 and 4 of the embodiment shown in FIGS. 1 and 2, thereby obviating the need for expanding end portions of the coil, inserting end fittings therein and brazing or soldering the joints.

Where the coiled tube formed by the method according to the invention is to be used as a heating unit, its output is dependant upon the temperature of the water in the primary circuit, the temperature of the water in the storage tank, water velocity through the heating unit and whether the water in the storage tank is hard or soft. Copper and steel heating units 1 have similar outputs but the mean output is advantageously approximately 15.000 btu/hr on gravity circulation to 30.000 btu/hr on pumped circulation. The circular cross-section of the coil 2 of the heating unit creates considerable turbulence to the convected water flow past the coil in the tank and ensures that the water temperature in the tank adjacent the coil is close to the mean storage temperature. With annular sheet metal heating units of the kind provided in factory made domestic hot water tanks for "indirect" heating, turbulence is less pronounced so that water temperature adjacent to the heating unit is well above mean storaage temperature particularly near the top. This accounts for the high output of a heating unit formed as a coiled tube relative to its surface area compared to sheet metal heating units of known kind.

What is claimed is:

1. Apparatus for forming a tube into a helical coil, comprising a cylindrical member having a helical groove therein, securing means for securing a portion of a tube adjacent one of the ends thereof to said cylindrical member, a grooved roller so mounted that the groove in the roller and the groove in the cylindrical member together define a circular aperture with a diameter substantially equal to the diameter of the tube to be formed into a helical coil, rotating means for rotating the cylindrical member and moving means for moving the grooved roller axially of the cylindrical member in a manner to cause the tube to be drawn into the helical groove in the cylindrical member and thereby to be wound into a helical coil with a pitch and diameter substantially corresponding to the pitch and diameter of the helical groove in the cylindrical member, said apparatus further characterized in that said securing means comprises a plug slidably mounted in a radially extending bore in said cylindrical member, formed to present a transverse aperture in which said portion of the tube can be inserted and including means whereby the plug can be retracted into said bore to clamp said portion of the tube against the outer face of said cylindrical member adjacent said bore.

2. Apparatus for forming a tube into a helical coil, comprising a cylindrical member having a helical groove therein, securing means for securing a portion of a tube adjacent one of the ends thereof to said cylindrical member, a grooved roller so mounted that the groove in the roller and the groove in the cylindrical member together define a circular aperture with a diameter substantially equal to the diameter of the tube to be formed into a helical coil, rotating means for rotating the cylindrical member and moving means for moving the grooved roller axially of the cylindrical member in a manner to cause the tube to be drawn into the helical groove in the cylindrical member and thereby to be wound into a helical coil with a pitch and diameter substantially corresponding to the pitch and diameter of the helical groove in the cylindrical member, said apparatus further characterized in that said moving means comprises a yoke axially movable with respect to said cylindrical member, said yoke mounting a plurality of rollers engaged in said helical groove in the cylindrical member at positions displaced circumferentially around said cylindrical member, said yoke also mounting said grooved roller said yoke further including means preventing rotational movement thereof.

3. Apparatus as claimed in claim 2, wherein said means for rotating the cylindrical member comprises electric motor means mounted in a housing, said cylindrical member extends upwardly from said housing with its axis of rotation vertical, said housing mounts a pair of upwardly extending members, one of said upwardly extending members being provided on one side of said cylindrical member and the other of said upwardly extending members being provided on an opposite side of said cylindrical member, and said yoke includes a pair of arms extending from said yoke in opposite directions each to engage a respective one of said upwardly extending members to prevent said yoke being carried around with said cylindrical member upon rotation of said cylindrical member by said electric motor means.

4. Apparatus as claimed in claim 3, wherein said pair of upwardly extending members are joined at their upper ends by a cross member and said cross member mounts means for counterbalancing the weight of said yoke.

5. Apparatus according to claim 2 wherein said yoke is a generally U-shaped member and further wherein at least one of said plurality of rollers is mounted on each arm of said U-shaped member, said U-shaped member being laterally removable from said cylindrical member.

6. Apparatus according to claim 5 wherein at least one of said plurality of rollers is mounted on the base of said U-shaped members.

7. Apparatus according to claim 5 wherein said U-shaped member carries at least two rollers for associating with said helical groove in the cylindrical member, the pair of circumferentially adjacent rollers located nearest the open portion of the U-shaped member being circumferentially spaced apart by at least about 180°, said grooved roller being coaxial with one of said pair of rollers.

8. Apparatus according to claim 2 wherein said yoke is laterally removable from said cylindrical member, and further wherein at least one of said plurality of rollers is so positioned with respect to said grooved roller that movement of said grooved roller away from the periphery of said cylindrical member by the action of said tube on said grooved roller causes said at least one of said plurality of rollers to move into said helical groove.

9. Apparatus according to claim 8 wherein said at least one of said plurality of said rollers is circumferentially adjacent to said grooved roller and is spaced at least about 180° around said cylindrical member from said grooved roller.

10. Apparatus according to claim 8 wherein said yoke is a U-shaped member including a removable cross piece spanning the two side arms of said U-shaped member and adapted to be removed therefrom for allowing said U-shaped member to be withdrawn from association with said cylindrical member.

* * * * *